United States Patent [19]

Akiyama et al.

[11] Patent Number: 5,784,464
[45] Date of Patent: Jul. 21, 1998

[54] SYSTEM FOR AND METHOD OF AUTHENTICATING A CLIENT

[75] Inventors: Ryota Akiyama; Akio Munakata; Yuzuru Koga; Masayuki Ishizaki, all of Kawasaki, Japan

[73] Assignee: Fujitsu Limited, Kawasaki, Japan

[21] Appl. No.: 594,895

[22] Filed: Jan. 31, 1996

[30] Foreign Application Priority Data

May 2, 1995 [JP] Japan ................... 7-108408

[51] Int. Cl.$^6$ ............... H04L 9/00; H04K 1/00
[52] U.S. Cl. ............ 380/25; 380/21; 395/187.01
[58] Field of Search ............... 380/21, 23, 24, 380/25; 395/187.01

[56] References Cited

U.S. PATENT DOCUMENTS

| | | |
|---|---|---|
| 4,247,106 | 1/1981 | Jeffers et al. . |
| 4,315,101 | 2/1982 | Atalla . |
| 4,439,670 | 3/1984 | Basset et al. . |
| 4,446,519 | 5/1984 | Thomas . |
| 4,484,217 | 11/1984 | Block et al. . |
| 4,558,176 | 12/1985 | Arnold et al. . |
| 4,590,557 | 5/1986 | Lillie . |
| 4,646,234 | 2/1987 | Tolman et al. . |
| 4,649,510 | 3/1987 | Schmidt . |
| 4,654,799 | 3/1987 | Ogaki et al. . |
| 4,658,093 | 4/1987 | Hellman . |
| 4,672,554 | 6/1987 | Ogaki . |
| 4,674,055 | 6/1987 | Ogaki et al. . |
| 4,740,890 | 4/1988 | William . |
| 4,780,905 | 10/1988 | Cruts et al. . |
| 4,787,050 | 11/1988 | Suzuki . |
| 4,799,061 | 1/1989 | Abraham et al. ........... 380/23 |
| 4,816,653 | 3/1989 | Anderl et al. . |
| 4,816,654 | 3/1989 | Anderl et al. . |
| 4,817,140 | 3/1989 | Chandra et al. . |
| 4,864,516 | 9/1989 | Gaither et al. . |
| 4,879,645 | 11/1989 | Tamada et al. . |
| 4,949,257 | 8/1990 | Orbach . |
| 4,999,806 | 3/1991 | Chernow et al. . |
| 5,006,849 | 4/1991 | Baarman et al. . |
| 5,008,814 | 4/1991 | Mathur . |
| 5,014,234 | 5/1991 | Edwards, Jr. . |
| 5,016,009 | 5/1991 | Whiting et al. . |
| 5,051,822 | 9/1991 | Rhoades . |
| 5,056,009 | 10/1991 | Mizuta . |
| 5,103,392 | 4/1992 | Mori . |
| 5,103,476 | 4/1992 | Waite et al. . |

(List continued on next page.)

OTHER PUBLICATIONS

Japanese Patent Laid-Open Publication No. 57-127249, Aug. 7, 1982 (equivalent to Japanese Patent Publication No. 61-22815).

Japanese Patent Laid-Open Publication No. 5-89363, Apr. 9, 1993.

Japanese Patent Laid-Open Publication No. 5-266575, Oct. 15, 1993.

Japanese Patent Laid-Open Publication No. 5-298085, Nov. 12, 1993.

Japanese Patent Laid-Open Publication No. 6-95871, Apr. 8, 1994.

*Primary Examiner*—Stephen C. Buczinski
*Attorney, Agent, or Firm*—Staas and Halsey

[57] ABSTRACT

A key management unit of a service provider system generates an individual key corresponding to a portable module connected to a service client making an access request and informs an authenticating unit of this individual key. The individual key is stored beforehand also in the portable module. A random-number generator generates a random number, transmits this random number to the portable module and informs the authenticating unit of it. The portable module encrypts the random number with the individual key and sends it back to the service provider system. An encrypting portion of the authenticating unit encrypts the random number with the individual key. A comparator of the authenticating unit compares data encrypted by the encrypting portion with encrypted data transmitted from the portable module and, if the two items of data are coincident with each other, confirms an access request from the portable module.

8 Claims, 13 Drawing Sheets

U.S. PATENT DOCUMENTS

| | | |
|---|---|---|
| 5,166,886 | 11/1992 | Molnar et al. . |
| 5,181,107 | 1/1993 | Rhoades . |
| 5,199,066 | 3/1993 | Logan . |
| 5,214,697 | 5/1993 | Saito . |
| 5,222,134 | 6/1993 | Waite et al. . |
| 5,245,330 | 9/1993 | Wassink . |
| 5,267,171 | 11/1993 | Suzuki et al. . |
| 5,323,465 | 6/1994 | Avarne ........ 380/23 |
| 5,371,796 | 12/1994 | Avarne ........ 380/23 |
| 5,481,611 | 1/1996 | Owens et al. ........ 380/25 |

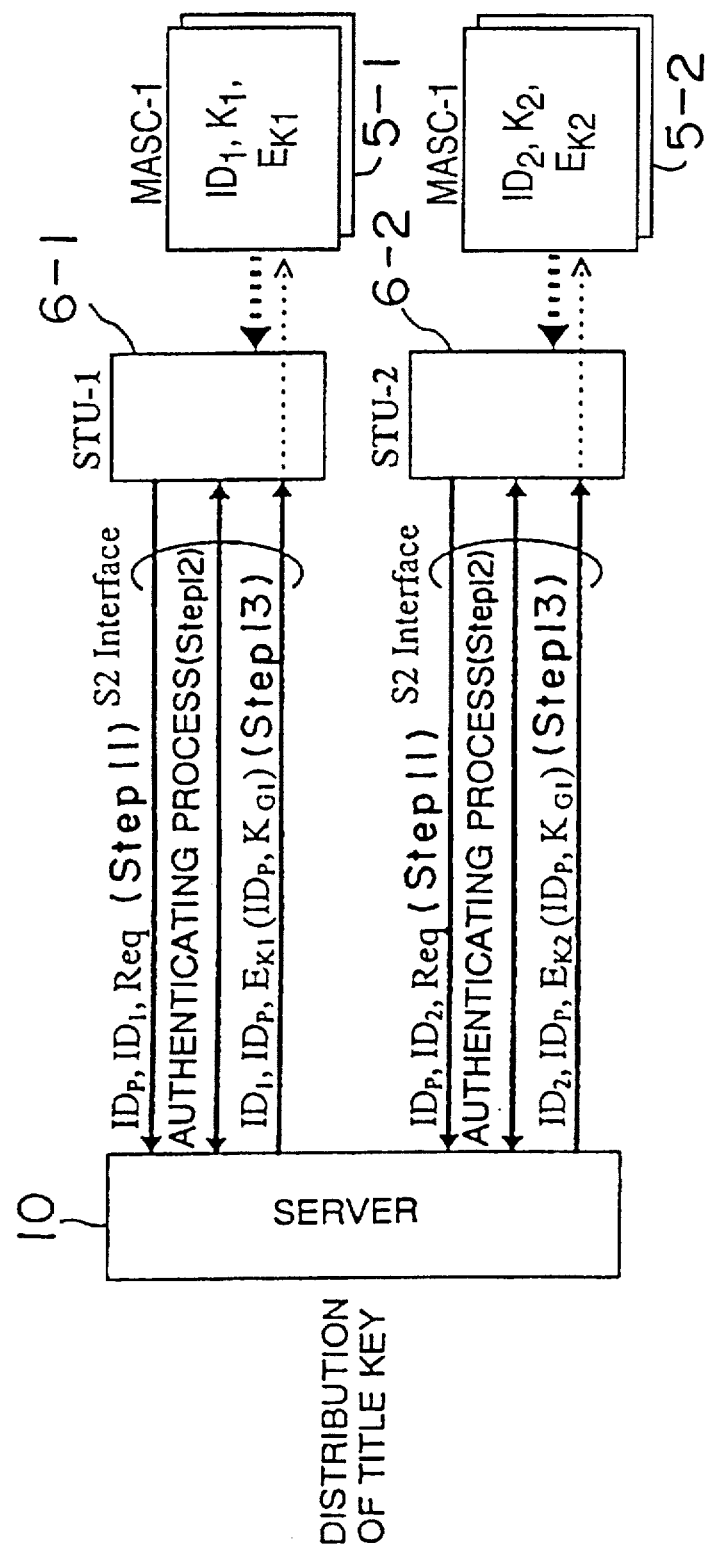

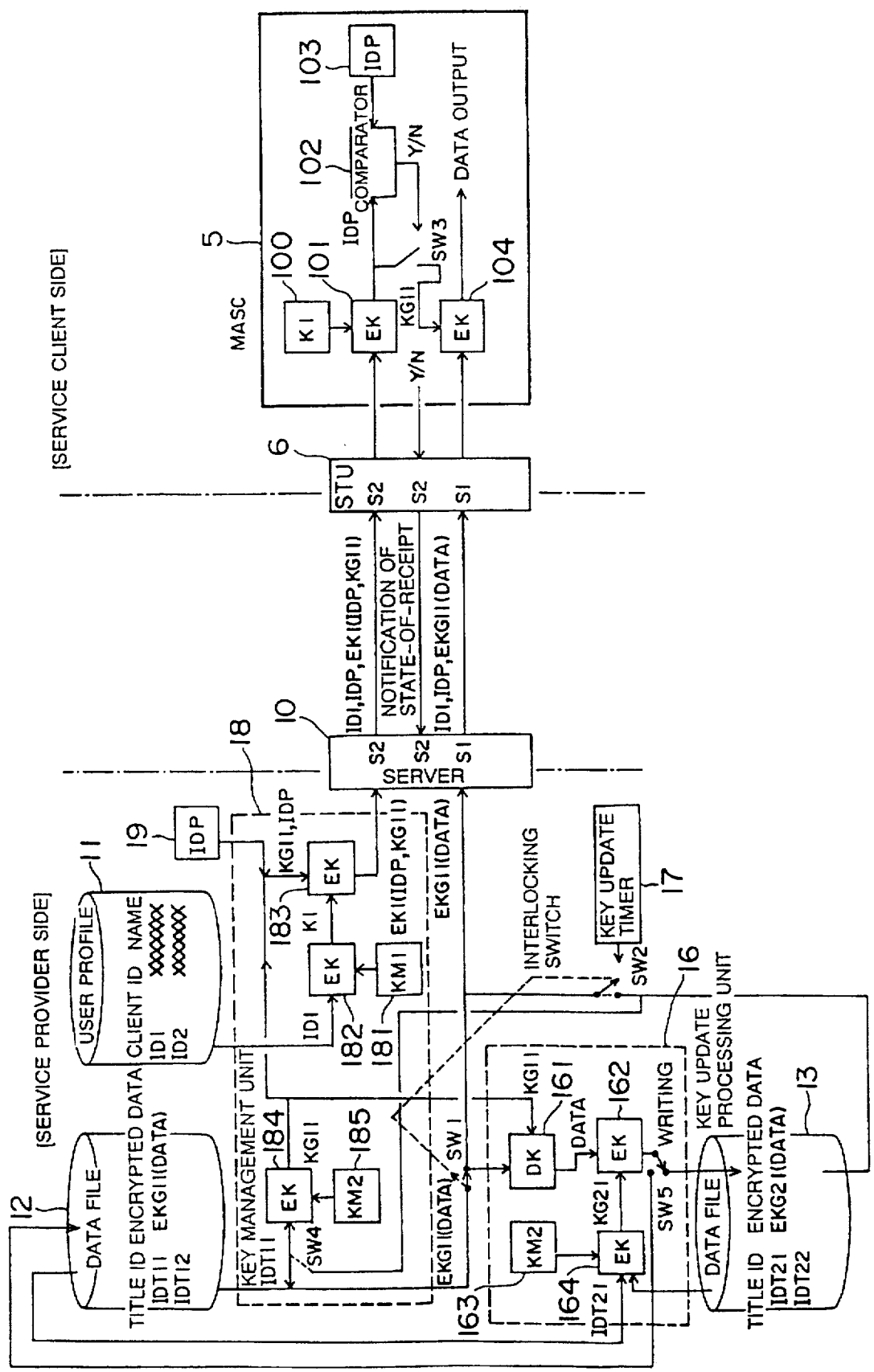

1

SYSTEM FOR AND METHOD OF AUTHENTICATING A CLIENT

BACKGROUND OF THE INVENTION

1. Field of the Invention

The present invention relates to a system for and a method of authenticating a client in a system (digital audio interactive system) and for distributing software such as a video authored work, etc. in response to a request from the client via a communication.

2. Related Background Art

In recent years, there have been proposed services for distributing digitally-informazed software (which includes audio data, video data, etc. and which is hereinafter referred to as "contents") to individual houses, etc. against the background of architectures of a cable TV system and of a communication system using a communication satellite. This service system is a digital audio interactive system known as a video-on-demand system. In this digital audio interactive system, a service provider and a user communicate with each other via a telephone line or the like. Then, the service provider distributes, to the user, the contents which are requested by the same user at a required time. The service provider also imposes a charge for using this software on the same user through a credit card company or the like and returns a part of the charge to a content provider.

Important conditions for a spread of the digital audio interactive system are that a server, a network and terminals used as an infrastructure be, constructed at low costs and that a great deal of contents which would be provided to the users with these infrastructure as mediums are prepared. Accordingly, the indispensable are that the infrastructure incorporates a mechanism wherein the content provider can count on profits from providing the contents; there is no possibility of undergoing an unexpected damage; and an environment (where the contents readily aggregate) is thereby prepared. Note that the above mechanism must be prepared irrespective of types (broadband integrated service digital network, satellite communication system, mobile communication system, optical media package, etc.) of media intervening between the content providers and the users.

The preparation of such an environment makes the content suppliers easily supply the contents with security. On the other hand, the users are able to get demanded contents in simple procedures anywhere and anytime. This is an important point for a much wider application of the system.

When constructing the system, it is required that the system be provided with an open-to-user property in which everybody can participate. It is also required to use a system for making use of the existing standard technology as much as possible. Further, the system is required to have an expendability corresponding to a diversification of a variety of services as well as to a technological advance.

As explained above, in the digital audio interactive system, the service provider has to identify which user makes a request for distributing the content and precisely impose the charge therefor. More specifically, the service provider must be prevented from distributing a content to a third party that does not register data (e.g., credit card number, bank account number, etc.) needed for imposing the charge, but pretends to be a user who registered those items of data. For this purpose, there has been proposed an authenticating system for collating a registered ID code with an ID code of the user making the content distribution request.

In the authenticating system based on the ID code, however, if the ID code is stolen by a third party, there is no countermeasure for preventing the ID code from being used by the third party. Note that there has also been proposed a system for putting a password on the ID code, but, if the password is stolen, the situation where the third party can use it remains the same.

SUMMARY OF THE INVENTION

Under such circumstances, it is a first object of the present invention to provide a client authenticating system for making the identification data impossible to be used by a third party by dynamically creating identification data used for the authentication between the user (client) and the service provider both in a client system and in a service provider system.

Further, if the system is designed to perform the authentication with simple ID codes, the user is capable of manually inputting the ID code. Therefore, the authentication can be performed for every user making a request for distributing the content. On the contrary, if dealing with complicated identification data, it is impossible to, dynamically create the identification data and even to manually input the identification data. Accordingly, in the authenticating system which has hitherto been proposed, an authenticating operation is automatically executed by a reproducing apparatus which reproduces the content, thus the authentication is conducted for every reproducing apparatus.

In the case where the authentication is conducted for every reproducing apparatus, however, the data about imposing the charge has to be registered for every reproducing apparatus if a plurality of reproducing apparatuses are provided. Further, even if data about imposing the charge on the user himself are registered in the service provider, it follows that the content can not be reproduced at all by, e.g., a reproducing apparatus borrowed from others. In the case of such an inflexible system, the spread of the system can not be expected for the reason elucidated above.

Then, it is a second object of the present invention to provide a client authenticating system constructed to impart data and to function to perform the authentication to a module readily portable by the user and attachable in common to a plurality of reproducing apparatuses.

To accomplish the first object of the present invention, there is provided a client authenticating system in a data distributing system having a data supplying apparatus for holding data and a client receiving the data distributed via a communication interface from the data supplying apparatus. The data supplying apparatus comprises a key outputting unit for outputting a first key corresponding to the client, a random-number generating element for generating a random number in response to an access request from the client, and a first encrypting element for encrypting the random number with said first key and thereby outputting a first authenticator. The data supplying apparatus further comprises a first transmitting element for transmitting the random number to the client, a first receiving element for receiving a second authenticator from the client and a comparing element for comparing the first and second authenticators with each other and, if the two authenticators are coincident with each other, authenticating the access request from the client. The client comprises an access requesting element for making an access request to the data supplying apparatus and a second receiving element for receiving the random number transmitted from the data supplying apparatus. The client further comprises a key holding element for holding a second key identical with the first key, a second encrypting element for encrypting the random number with the second key and thereby outputting the second authenticator and a second transmitting element for transmitting the second authenticator to the data supplying apparatus.

The access requesting element may be constructed to notify the data supplying apparatus of identification data intrinsic to the client when making the access request, and the key outputting unit may be constructed to generate the first key by processing the identification data intrinsic to each client.

The data supplying apparatus may be constructed to distribute, only when the comparing element determines that the two authenticators are coincident with each other, the data to the client.

The data supplying apparatus may be also constructed to distribute the encrypted data to the client. In this case, the client is constructed to include a first decrypting element for decrypting the encrypted data.

The data supplying apparatus may be constructed to include a third encrypting element for encrypting the third key for decrypting the data by use of the first key.

In this case, the client is constructed to include a second decrypting element for decrypting the encrypted third key by use of the second key. Then, the first decrypting element decrypts the encrypted data with the third key decrypted by the second decrypting element.

The data supplying apparatus may be constructed to further include a plurality of storage devices for storing the encrypted data, a third decrypting element for decrypting the encrypted data stored in one storage device by use of the third key, a key updating element for updating the third key, a third encrypting element for encrypting the data decrypted by the third decrypting means by use of the third key updated by the key updating means and a storing element for storing the other storage device with the data encrypted by the third encrypting element. Thus, the storage devices are dualized, and the data can be thereby backed up, and the encrypted key is updated each time, with the result that the data security is improved.

Note that the third decrypting element, the key updating element, the third encrypting element and the writing element may be started at intervals of a fixed time.

To accomplish the first object described above, according to the present invention, there is provided a client authenticating method in a data distributing system constructed of a data supplying apparatus for holding data and a client receiving the data transmitted via a communication interface from the data supplying apparatus. According to this method, the client makes an access request to the data supplying apparatus with an identification data for identifying the client itself informed to the apparatus. Next, the data supplying apparatus generates a random number in response to the access request, transmits the random number to the client, encrypts the random number by use of a first key corresponding to the identification data and converts the encrypted random number into a first authenticator. Subsequently, the client encrypts the random number by use of a second key previously held as the one having the same content as that of the first key, converts the encrypted random number into a second authenticator and transmits the second authenticator to the data supplying apparatus. Then, the data supplying apparatus compares the first authenticator with the second authenticator and, if the two authenticators are the same, authenticates that an access request is given from the client.

According to a second aspect of the present invention, in the client authenticating system, the client is constructed of a body unit for receiving the data and a module unit detachably attached to the body unit. Then, the module unit includes at least the key holding element and the second encrypting element. Note that the above identification data are, when used in this second aspect, stored in the module unit. Further, when the first decrypting element and the second decrypting element are provided in this second aspect, these decrypting elements are incorporated into the module unit.

According to a first aspect of the present invention, when the access requesting element of the client makes the access request to the data supplying apparatus, in response to this access request, the random-number generating element of the data supplying apparatus generates the random number, and the key outputting unit outputs the first key corresponding to this client. Then, the first communicating element transmits the random number to the client making the access request. Further, the first encrypting element encrypts the random number with the first key outputted by the key outputting unit, thereby outputting the first authenticator. On the other hand, when the second receiving element of the client receives the random number, the second encrypting element encrypts this random number with the second key identical with the first key held by the key holding element, thereby outputting the second authenticator. The second transmitting element transmits the second authenticator to the data supplying apparatus. When the first receiving element of the data supplying apparatus receives the second authenticator, the comparing element compares the first authenticator with the second authenticator and, if the two authenticators are the same, authenticates the access request given from the relevant client. Accordingly, the identification data (authenticator) transmitted via the communication interface are encrypted, and a result of this encryption changes corresponding to the random number but is not fixed. Therefore, the steal by the third party is impossible.

According to a second aspect of the present invention, the module unit detachably attached to the body unit incorporates at least the constructive element (key holding element) for holding the data needed for the authentication and the constructive element (second encrypting element) for performing the process required for the authentication. Hence, whoever has the body unit, that user is capable of receiving the distribution of the data by connecting the module unit of the user's own to the body unit.

BRIEF DESCRIPTION OF THE DRAWINGS

The present invention will become more fully understood from the detailed description given hereinbelow and the accompanying drawings which are given by way of illustration only, and thus are not intended to limit the scope of the present invention, and wherein:

FIG. 8 is a time arrow diagram showing a key distributing process;

FIG. 9 is a block diagram illustrating a construction relative to the key distributing process;

DESCRIPTION OF THE PREFERRED EMBODIMENT

One embodiment of the present invention will hereinafter be discussed with reference to the accompanying drawings. In accordance with this embodiment, a client authenticating system according to the present invention is applied to a digital audio interactive system. Note that a content reproducing apparatus for reproducing contents is referred to as a "service client" in the following discussion.

<Construction of Embodiment>

(Whole Configuration of System)

Figure 1:
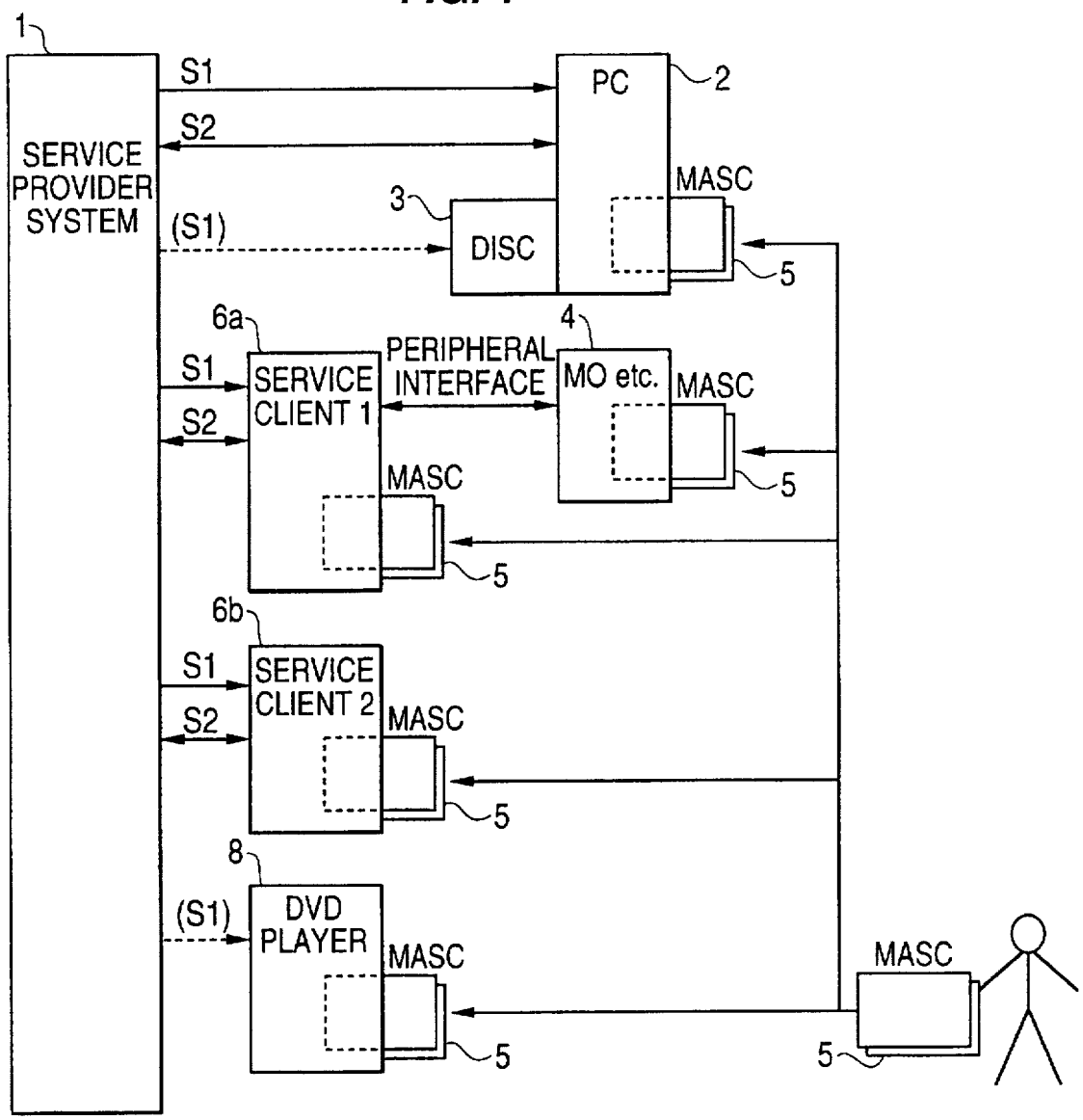
FIG. 1 is a schematic diagram illustrating a digital audio interactive system to which a client authenticating system in one embodiment of the present invention is applied.

FIG. 1 illustrates a digital audio interactive system in this embodiment. This interactive system is constructed of a service provider system 1 for storing a multiplicity of contents and distributing those contents and of a multiplicity of terminals for reproducing the contents. The terminal includes a personal computer 2, service clients 6a, 6b and a DVD player 8. Further, a removable disc device 3 is connected to the personal computer 2. Moreover, a magneto-optic disc drive 4 is connected via a SCSI interface to the first service client 6a. Each terminal exclusive of the DVD player 8 is connected to the service provider system 1 via a principal service layer interface of S1 and an application service layer interface of S2.

Figure 2:
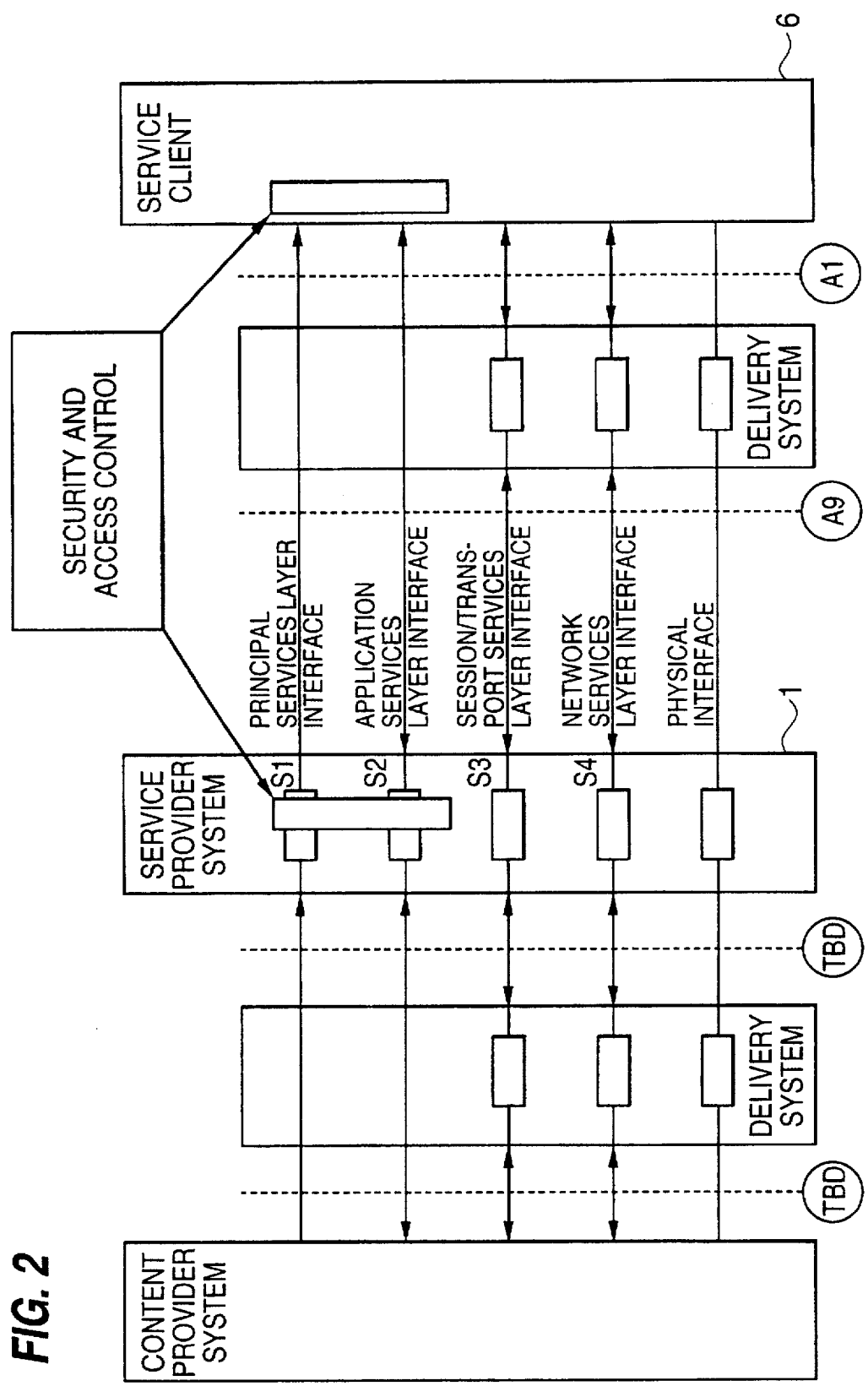
FIG. 2 is a diagram showing a system reference model corresponding to the digital audio interactive system of FIG. 1.

The principal service layer interface of S1 and the application service layer interface of S2 are interfaces defined by a DAVIC 1.0 system reference model shown in FIG. 2. This principal service layer interface of S1 is an interface for distributing the contents and may be, more specifically, a cable of a cable TV system, a satellite link and an ISDN. Further, the application service layer interface of S2 is an interface for exchanging access control data and may be the cable of the cable TV system that also serves as the principal service layer interface of S1, the ISDN and an analog telephone network.

It is to be noted that "S1" shown in FIG. 1 implies a physical transport. That is, the symbol "S1" indicates that a floppy disc containing contents, which were purchased from the service provider, is transported and loaded into the removable disc device 3 of the personal computer 1. This alternatively indicates that the video disc containing the contents, which was purchased from the service provider, is transported and loaded into the DVD player 8. Such a physical transport also corresponds to the S1 interface. Similarly, the control data may be transmitted by FAX or by mail, and this also corresponds to the S2 interface.

In the digital audio interactive system in accordance with this embodiment, for the purpose of preventing pieces of confidential information or chargeable contents provided by the content provider or the service provider from being easily intercepted, a security mechanism is provided between the service provider system 1 and the service clients 6. This security mechanism encrypts the contents and provide the service clients with the encrypted contents in order to prevent the contents supplied from the service provider system 1 from being abused or diverted by a third party. That is, in the digital audio interactive system in accordance with this embodiment, a security-and-access control function is incorporated into the service provider system 1 and the service clients 6 as well on the basis of the DAVIC 1.0 system reference model shown in FIG. 2.

Further, in the digital audio interactive system in accordance with this embodiment, for incorporating a decoding function into the service clients 6, a hardware architecture (which is hard to imitate and remodel) is partly adopted, thus actualizing authentication and confidentiality.

Further, in the digital audio interactive system in accordance with this embodiment, a module (hereinafter termed a "MASC: Media Access and Security Card") 5 portable by the user and incorporates functions related to a user's security such as data about an algorithm for actualizing the decoding function, a key management, authentication, confidentiality and accounting, in terms of considering usability to the user. This MASC 5 is removably set in the service client 6. Therefore, the same service can be accepted by one user or even other service clients 6 to which the user's MASC 5 is set.

Moreover, in the digital audio interactive system in accordance with this embodiment, for treating other standardizing operations with respect, the authenticating method on the side of the service clients 6 is pursuant to ISO/IEC9798-2. Also, a key managing method is pursuant to the method adopted in the B-MAC scramble broadcasting. An encryption registering method is pursuant to ISO/IEC9979, and only a key size and an I/O data size are specified, but a processing algorithm is not specified. Further, a concept of a DVB method is partly changed and used in a physical interface to the service client 6 of the MASC 5.

Also, in the digital audio interactive system in accordance with this embodiment, a data processing method and data structure with a high expendability are adopted so as to correspond to diversification of a content providing form (cable, satellite communication system, package, and so on).

<Construction of Service Provider System>

Figure 3:
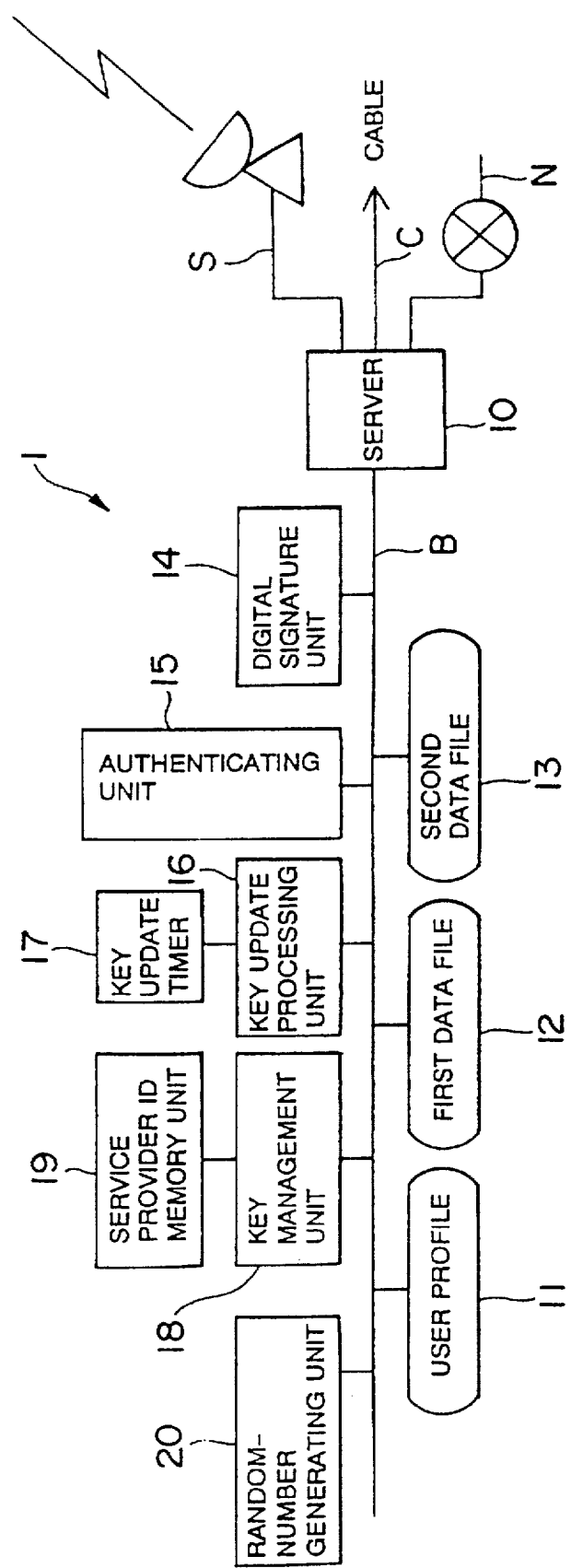
FIG. 3 is a block diagram illustrating a construction of a service provider system of FIG. 1.

Next, an internal construction of the service provider system 1 as a data supplying apparatus will be explained with reference to FIG. 3. As illustrated in FIG. 3, the service provider system 1 is constructed of a server 10, user profiles 11, a first data file 12, a second data file 13, a digital signature unit 14, an authenticating unit 15, a key update processing unit 16, a key management unit 18, a random-number generator 20 which are each connected to a bus B, a key update timer 17 connected to the key update processing unit 16 and a service provider ID memory unit 19 connected to the key management unit 18. Connected to the server 10 are a satellite communication line S, a cable C of a cable TV system and a telephone network N.

The server 10 conceived as a first transmitting element and a first receiving element as well is a processing apparatus for controlling the whole service provider system 1 and performing communications with the service clients 6 via the satellite communication line S, the cable TV system cable C and the telephone network N.

The user profile 11 is a database registered with IDs of the respective MASCs.

The first data file 12 is a database stored with a multiplicity of encrypted contents and IDs (title IDs) thereof. The second data file 13 is a database stored with a multiplicity of re-encrypted contents which had been stored in the first data file 12 and re-encrypted by use of a different key and with title IDs thereof. That is, the contents stored in the data files 12, 13 are re-encrypted at intervals of a fixed time and transferred from one data file to another one. Note that the contents stored in the data files 12, 13 are subjected to compression processing beforehand on the basis of MPEG-2 standards.

The digital signature unit 14 is a unit for transmitting, to the service client 6, data for permitting a reproduction of the contents in a fixed period which corresponds to an amount of money imposed on the user with a piece of digital signature information for logically demonstrating that this item of data is correct.

The authenticating unit 15 performs an operation of checking which MASC 5 whose ID is registered in the user profile 11 is attached to the service client 6 accessing to the service provider system 1 through communications.

The random-number generator 20 conceived as a random-number generating element generates a random number used for the operation of the authenticating unit 15.

A key management unit 18 serving as a key output unit generates a key (first key) employed for identifying the MASC in the authenticating unit 15 from the MASC's ID registered in the user profile 11. The key management unit 18 also generates a key (third key) for restoring the encrypted contents stored in the respective data files 12, 13 on the basis of a corresponding title ID.

The service provider ID memory unit 19 is a memory for holding IDs (service provider ID: IDP) of the service provider system 1, which are used for generating the keys in the key management unit 18.

The key update processing unit 16 restores the contents stored in one of the data files 12, 13 on the basis of the title ID generated in the key management unit 18 and creates a new key. The key update processing unit 16 then encrypts the thus restored contents by use of this new key and stores the other data file 12 or 13 with the thus encrypted contents.

The key update timer 17 is a timer for regulating a timing of processing in the key update processing unit 16.

<Construction of Service Client System>

Next, a construction of the service client system will be described with reference to FIG. 4.

Figure 4:
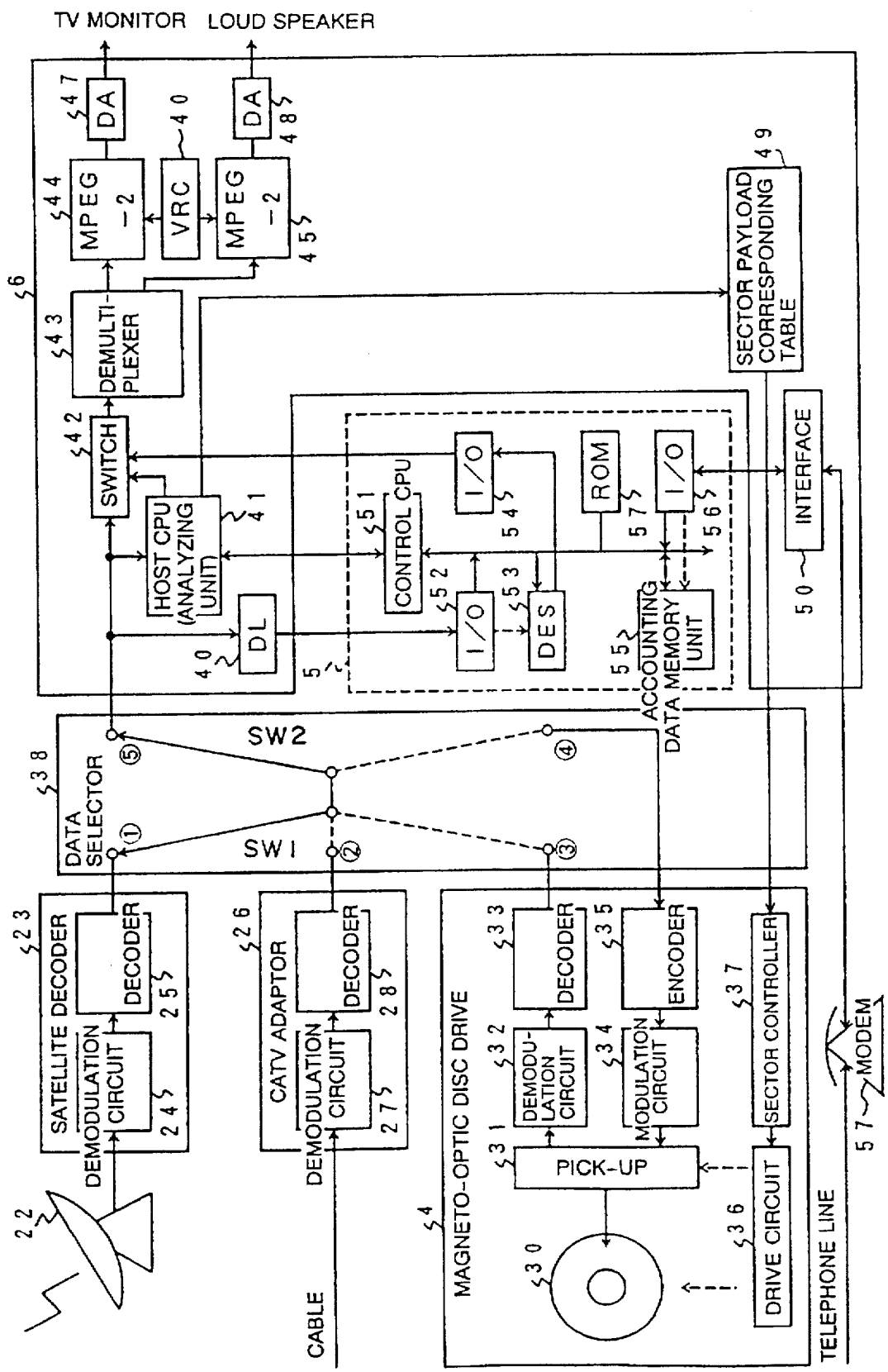
FIG. 4 is a block diagram showing a construction of the service client system of FIG. 1.

As illustrated in FIG. 4, the service client system is constructed of a parabolic antenna 22 for receiving electronic radio waves for the satellite communication, a satellite decoder 23 connected to this parabolic antenna 22, a CATV adapter 26 connected to the cable of the cable TV system and a magneto-optic disc drive 4. The service client system is further constructed of a data selector 38 connected to the satellite decoder 23, the CATV adapter 26 and the magneto-optic disc drive 4, the service client 6 serving as a body unit connected to the data selector 38, the MASC 5 serving as a module unit attached to the service client 6 and a MODEM 57 connected to the telephone network N.

The satellite decoder 23 comprises a demodulation circuit 24 for demodulating signals received by the parabolic antenna 22 and a decoder 25 for executing an error correction of the demodulated signal and rearrangement of the bits. An output terminal of the decoder 25 is connected to a first connector of the data selector 38.

The CATV adapter 26 comprises a demodulation circuit 27 for demodulating signals received via the cable and a decoder 28 for executing the error correction of the demodulated signal and the rearrangement of the bits. An output terminal of the decoder 28 is connected to a second connector of the data selector 38.

The magneto-optic disc drive 4 consists of an encoder 35 connected to a fourth connector of the data selector 38, a modulation circuit 34 for modulating the data in which the error correction and the bit rearrangement are executed by the encoder 35, a pick-up 31 for writing and reading the data to and from the magneto-optic disc 30 and a demodulation circuit 32 for demodulating the data read by the pick-up 31. The magneto-optical disc drive 4 further consists of a decoder 33 for executing the error correction of the demodulated signal and the bit rearrangement and a drive circuit 36 for causing the magneto-optic disc 30 to rotate and for tracking the pick-up 31. An output terminal of the decoder 33 is connected to a third connector of the data selector 38.

The data selector 38 outputs the data inputted from one of the first through third connectors to one of the fourth and the fifth connector. For this purpose, the data selector 38 includes a switch SW1 for selecting which connector is connected to a connection line among the first through third connectors and a switch SW2 for selecting which connector of the fourth or fifth connectors is connected to the connection line.

The service client 6 is constructed of a DL 40, a host CPU 41 and a switch 42 which are respectively connected to a fifth connector of the data selector 38, a demultiplexer 43 connected to the switch 42, an MPEG expansion circuit 44 connected to this multiplexer 43 and a D/A converter 47 connected to this video MPEG expansion circuit 44. The service client 6 is further constructed of a audio MPEG expansion circuit 45 connected to the multiplexer 43, a D/A converter 48 connected to the audio MPEG expansion circuit 45, a synchronizing circuit 46 connected to the two MPEG expansion circuits 44, 45, a sector payload corresponding table 49 connected to the host CPU 41 and an interface 50 connected to the MODEM 57.

The DL 40 is a delay line device which is a bandwidth translating device composed of a toggle buffer or FIFO memory.

The switch 42 works to connect a signal line from the data selector 38 or from the MASC 5 to the demultiplexer 43 in accordance with an indication given from the host CPU 41. Further, the switch 42 also opens the circuits in response to an indication from the host CPU 41.

The host CPU 41 is a control device for controlling all the service clients 6. Further, the host CPU 41 analyzes whether or not the contents received from the data selector 38 have been encrypted beforehand. Then, if not encrypted, the host CPU 41 gives the switch 42 an indication to connect the signal line led from the data selector 38 to the demultiplexer 43. Whereas if encrypted, the host CPU 41 gives the switch 42 an indication to connect the signal line from the MASC 5 to the demultiplexer 43 and also indicates the MASC 5 to perform decryption. Note that the host CPU 41, when there is given an indication from the control CPU 51 of the MASC 5, indicates the switch 42 to connect the signal line from the data selector 38 to the demultiplexer 43 even if the contents have been encrypted. Moreover, the host CPU 41 gives a notice to the MASC 5 every time each of frames constituting the contents is received from the data selector 38.

The demultiplexer 43 demultiplexes audio and video data frames in the contents. Then, the video data frame is outputted to the video MPEG expansion circuit (MPEG-2) 44, while the audio data frame is outputted to the audio MPEG expansion circuit (MPEG-2) 45.

The MPEG expansion circuits (MPEG-2) 44, 45 are circuits for expanding the video or audio data frames transmitted in an as-compressed state on MPEG standards and thus restore the images or voices in a possible-of-output format. When those MPEG expansion circuits (MPEG-2) 44, 45 expand the data frames, the outputs thereof are synchronized by the synchronizing circuit 46. That is, each of the MPEG expansion circuits (MPEG-2) 44, 45 outputs the expanded data frame synchronizing with the synchronous signal outputted from the synchronizing circuit 46.

The output from the video MPEG expansion circuit (MPEG-2) 44 is converted into an analog signal by the D/A converter 47. This analog signal is outputted to an unillustrated TV monitor device connected to the service client 6. Further, the output from the audio MPEG expansion circuit (MPEG-2) 45 is converted into the analog signal by the D/A converter 48. This analog signal is outputted to an unillustrated loud speaker connected to the service client 6.

The sector payload corresponding table 49 is a table for showing a relationship between the frames and a sector on the magneto-optic disc 30. More specifically, when reading the contents from the magneto-optic disc drive 4, each time the host CPU 41 reads each frame, a correspondence between the frame and the sector is checked based on the sector payload corresponding table 49. Then, when all the frames have been read from the current sector, an indication with an effect of performing tracking of the pick-up 31 is given to the sector controller 37.

The interface 50 serving as a second transmitting/receiving element communicates with the server 10 of the service provider system 1 via the MODEM 57 and the telephone network N (S") and transmits and receives the control data to and from the server 10.

Given next is an explanation of the MASC 5 connected to the DL 40, the host CPU 41, the switch 42 and the interface 50. A variety of contents provided to the service clients 6 are distributed via communication media easily available as in the case of the satellite communications in some cases, and a question is therefore the way of how charges for the reproduction of the contents are imposed. Further, the contents distributed via such communication media are distributed in a previously-encrypted state in order to prevent the contents from being misappropriated by the third party and therefore are required to be decrypted. The MASC 5 is used for this purpose. That is, the MASC 5 decrypts the contents received through the DL 40 and transmits the decrypted contents to the switch 42 in response to the indication given from the host CPU 41. Also, the MASC 5 counts the notice given by the host CPU 41 each time the frame 41 is received and subtracts an accounting counter value X. This accounting counter value X is a point written to the MASC 5 as such a compensation that the user approves a payment of charges to the digital signature unit 14 of the service provider system 1. The MASC 5 causes, just when the accounting counter value X becomes 0, the host CPU 41 to open the switch 42.

Note that the MASC 5 is actualized in the form of an IC card removably inserted into a card slot (pursuant to, e.g., the PCMCIA) of the service client 6. If set in the form of the IC card, the transport of the SD circuit becomes easier.

The MASC 5 is constructed of a control CPU 51, a DES (Data Encryption Standard) 53, an accounting data memory unit 55, a ROM 57 and I/O devices 52, 54, 56, which are all connected to each other via a bus.

The control CPU 51 is connected to a host CPU 41 in the service client 6 and makes the DES 53 execute a decrypting process in response to an indication given from the host CPU 41. Further, the control CPU 51 subtracts the accounting counter value X stored in the accounting data memory unit 55 in response to a frame receiving notice given from the host CPU 41 and, when this accounting counter value X comes to 0, causes the CPU 41 to open the switch 42. Further, the control CPU 51 carries out communications with the service provider system 1 via the I/O device 56, the interface 50 and the MODEM 57, thus executing processes needed for an access request, the digital signature and the user authentication (corresponding to an access requesting element).

The ROM 57 serving as a key holding element is a memory for storing various items of data (e.g., an identification $ID_i$ "intrinsic identification data" for identifying the MASC 5 and an individual key $K_i$ "second key" prepared as a key intrinsic to the MASC 5) required for the processes in the control CPU 51.

The accounting data memory unit 55 is a memory for storing the above accounting counter value X. It is to be noted that the accounting counter value X is encrypted in the accounting data memory unit 55. Accordingly, it is impossible for the user to rewrite the accounting counter value X by analyzing the accounting data memory unit 55.

The DES 53 serving as a second encrypting element and first and second decrypting elements incorporates a function to decrypt the contents received from the DL 40 through the I/O device 52 and also has a function to perform the encrypting and decrypting processes necessary for the digital signature and the user authentication that are to be effected by the control CPU 51. The contents (video and audio frames) decrypted by the DES 53 are transmitted via the I/O device 54 to the switch 42.

<Processing in the Embodiment>

Next, control processes executed between the service provider system 1 and the service clients 6 in the digital audio interactive system in this embodiment will be explained with reference to flowcharts and functional block diagrams showing the functions carried out in respective steps in the flowcharts.

When the service client 6 accesses the data under the management of the service provider system 1, a safety communication control element may be needed. This differs depending on the forms of the interfaces of S1, S2 which link the service client 6 to the service provider system 1.

(Content Data Transmission Control Process)

To start with, there will be described a control process on the occasion the service client 6 requires the distribution of a content to the service provider system 1. In this case, the control is different depending on whether or not the interfaces of S1, S2 are the communication media exhibiting a high confidentiality holding property. The reason is that the encrypting process is indispensable for preventing the misappropriation and data falsification by the third party in the case of distributing the contents through the communication media exhibiting a low confidentiality holding property.

<Content Data Supply Control Through Communication Media with High Confidentiality Holding Property>

Figure 5:
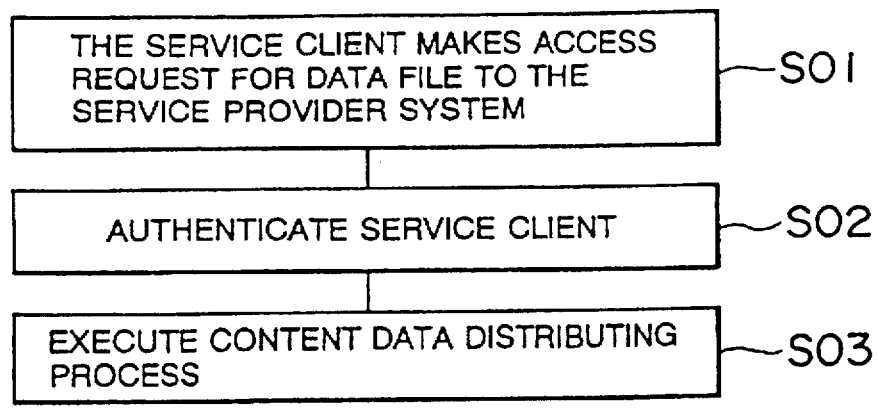
FIG. 5 is a flowchart showing content data supplying process using a communication medium exhibiting a high confidentiality holding property.

FIG. 5 shows the control when the interfaces of S1, S2 are constructed in the form of a reliable network comparatively highly resistive against the data misappropriation and the data falsification as in the case of, e.g., an optical fiber cable (cable of the cable TV system, etc.). In this case, the only problem is an illegal access from the service client 6. Accordingly, the authentication for establishing a right of access is of importance.

An outline of operating procedures in this case will be explained. At first, the user inserts the MASC 5 into the service client 6. Hereupon, the service client 6 reads the identification ID ($ID_i$) of the MASC 5 and notifies the service provider system 1 of this identification ID ($ID_i$).

Then, the service provider system 1 authenticates which MASC 5 it is. Next, the service provider system 1 distributes the required contents to the service client 6 and operates the accounting system. As a result, the service client 6 gets the contents.

Access Request

In first step S01 in FIG. 5, the service client 6 makes an access request to the service provider system 1. As a premise of this, the intrinsic-to-module identification ID ($ID_i$), the individual key $K_i$ and an authentication algorithm EK(X) are safely stored in the MASC 5.

The user connects the MASC 5 to an arbitrary service client 6 and inputs the identification ID (service provider ID: $ID_p$) of the service provider system 1 through an unillustrated operation key. Hereupon, as illustrated at (1) in FIG. 6, the service client 6 transmits a data file access request command (REQ) with respect to the service provider system 1 and the intrinsic-to-module identification ID ($ID_i$) via the interface of S2 to the service provider system 1 while adding a destination which is a combination of the identification ID ($ID_p$) of the service provider system 1 with the identification ID (address) of the service client 6 to the data file access request command (REQ) and the intrinsic-to-module identification ID ($ID_i$). Note that the service client 6 transmits a title ID (IDT) of the content required to be distributed to the service provider system 1.

Authenticating Process

In next step S02 in FIG. 5, the service provider system 1 performs the authenticating process of the service client 6. This service client authentication is executed for the purpose of hindering an illegal access by a third party exclusive of the relevant party to the data file of the service provider system 1. The authentication is conducted by making use of ISO/IEC9798-2 on the basis of the fact that the confidential key data shared mutually with the relevant parties are the same.

Figure 6:
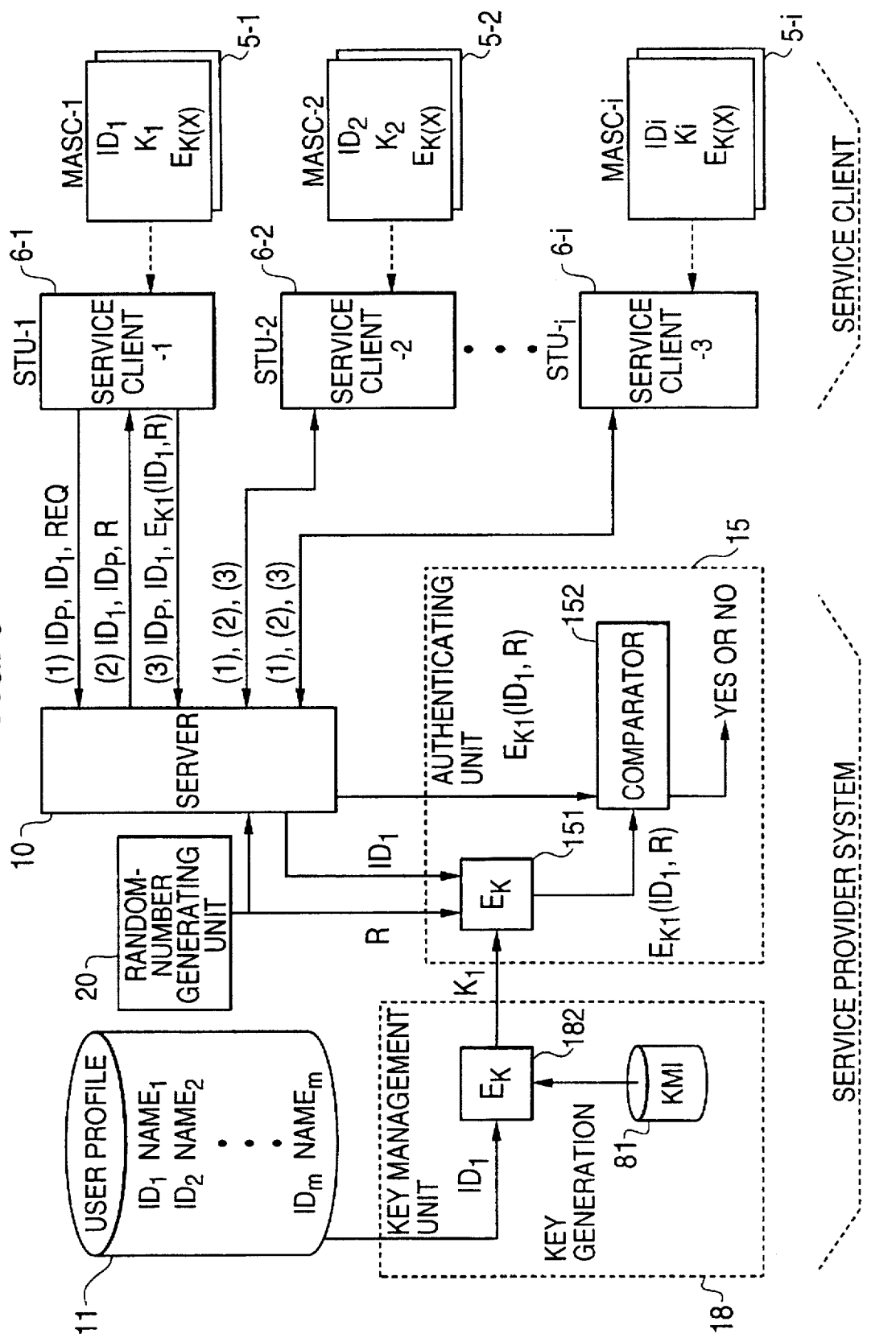
FIG. 6 is a block diagram showing a construction relative to an authenticating process.

When the service provider system 1 authenticates a validity of the service client 6 making the access request to the service provider system 1, the authenticating process is carried out as shown in FIG. 6. Note that the communications for this authentication are conducted through the S2 interface.

When the server 10 of the service provider system 1 receives the access request (REQ) from the service client 6 (1), a first key generating portion ($E_K$, key outputting portion) 182 in the key management unit 18 confirms that the received MASC identification ID ($ID_i$) is registered in the user profile 11 and, on the basis of the identification ID ($ID_i$) in the user profile 11, generates a client individual key (first key) $K_i$ by use of a first master key (KM1) 81 under the management of the service provider. The first master key (KM1) 81 is the same as the master key employed when generating an individual key (second key) $K_i$ stored in the MASC 5. Accordingly, as long as the MASC identification ID ($ID_i$) received is the same as the identification ID ($ID_i$) registered in the user profile 11, it follows that the client individual key $K_i$ absolutely identical with the individual key $K_i$ in the MASC 5 is to be generated.

Simultaneously with this, the random-number generating unit 20 in the service provider system 1 generates a random number R. This random number R is inputted to the authentication unit 15 and the server 10 as well. The server 10 transmits, to the service client 6, the random number R while adding a service-client-oriented destination which is a combination of the identification ID ($ID_i$, address) of the service client 6 with the identification ID (IDP) of the service provider system 1 to this random number R(2).

The service client 6 receiving the data from the service provider system 1 supplies the MASC 5 with the random number R contained in the data. Hereupon, the MASC 5 combines the MASC identification ID ($ID_i$) with the random number R and encrypts this with the individual key $K_i$, thereby generating a second authenticator ($E_{ki}(ID_i, R)$). The service client 6 adds the destination of the service provider system 1 to the second authenticator ($E_{ki}(ID_i, R)$) and transmits it again back to the service provider system 1 (3).

The service provider system 1 receiving this item of client data sets the second authenticator ($E_{ki}(ID_i, R)$) contained in this item of data in a comparator (comparing element) 152 in the authenticating unit 15. Further, a first encrypting portion ($E_k$, first encrypting element) 151 within the authenticating unit 15 combines the MASC identification ID ($ID_i$) received from the service client 6 with the random number R received from the random-number generating unit 20 and encrypts this combination with the client individual key $K_i$ generated by the key generating portion 182, thereby generating a first authenticator ($E_{ki}(ID_i, R)$). The first encrypting portion 151 sets this first authenticator ($E_{ki}(ID_i, R)$) in the comparator 152 and makes the comparator 152 compare it with the previously-set second authenticator ($E_{ki}(ID_i, R)$). If the two authenticators are identical with each other in the comparator 152, it means that the same individual key $K_i$ is held between the service client 6 and the service provider system 1. Hence, the authenticating unit 15 authenticates the relevant service client 6 as a communication party concerned and makes subsequent processes executable. Whereas if not identical, the authenticating unit 15 determines that it is the service client in which the corresponding accounting data are not registered in the MASC 5 thereof and inhibits the subsequent processes.

As discussed above, according to the authenticating method in this embodiment, the arrangement is not that the individual key $K_i$ itself as an authentication target is transmitted on the interface but merely that there is transmitted the authenticator ($E_{ki}(ID_i, R)$) in which the random number R generated for every access request is encrypted with this individual key $K_i$. Accordingly, even if the third party steals the random number R, unless the third party knows the content of the individual key $K_i$, it is impossible to generate the authenticator ($E_{ki}(ID_i, R)$). Further, even if the authenticator ($E_{ki}(ID_i, R)$) itself is stolen, but when the regular user has already been authenticated, the random number R for this authenticator ($E_{ki}(ID_i, R)$) is not set in the authenticating unit 15. Therefore, this authenticator ($E_{ki}(ID_i, R)$) has already been invalidated. Thus, in any case, the illegal access by the third party is hindered.

Note that when the service client 6 authenticates the service provider system 1, the same procedures are to be executed by reversing the positions of the service client 6 and the service provider system 1, and the service client 6 is thereby capable of authenticating the service provider system 1.

Further, parameters used in the authenticating process differ depending on a generation algorithm of the authenticator. For example, when adopting DES (DATA ENCRYPTION STANDARD) for the generation algorithm, the parameters are as follows:

| | |
|---|---|
| Random Number R | : 32 bits |
| MASC Identification ID | : 32 bits |
| | (Remaining 32 bits undergo padding when ECB inputting is |

-continued

| | |
|---|---|
| | carried out.) |
| Individual Key $K_i$ | : 56 bits |
| Master Key KM | : 168 bits (56 bits × 3) |
| Using Mode of Service Provider System 1 | : TRIPLE ECB (ELECTRONIC CODE BOOK) (Individual Key Generation, Generation of Random Number) |
| Using Mode of Service Client | : ECB (Authenticating Process) |

Content Data Distributing Process

In next step S03 in FIG. 5, a content data distributing process from the service client 6 is carried out. That is, the service provider system 1 reads a content (encrypted content) corresponding to the title ID (IDT) requested from the service client 6 from one of the data files 12, 13 and decrypts this content. Then, the decrypted content is transmitted via the S1 interface to the service client 6.

The service client 6 receiving the content transmits this content temporarily to the optical disc drive 4 and writes it onto the optical disc 30 or allows it to flow directly to the host CPU 41. The host CPU 41 analyzes that this content is not yet encrypted and changes over the switch 42 to the data selector 38. Accordingly, the content is demultiplexed into the video frame and the audio frame by the demultiplexer 43. These frames are expanded by the MPEG expansion circuits 44, 45 and converted into analog signals by the D/A converters 47, 48. Then, the video signals are transmitted to the unillustrated TV monitor, while the audio signals are transmitted to the unillustrated loud speaker.

Further, the host CPU 41 gives a notice to the control CPU 51 in the MASC 5 each time each of the frames constituting the content is read. This control CPU 51 counts the number of the notices and subtracts the accounting counter value X in the accounting data memory unit 55. Subsequently, when this accounting counter value X comes to 0, the control CPU 51 causes the host CPU 41 to open the switch 42. Accordingly, there is hindered the use of the content exceeding a use permission quantity corresponding to an amount of money to be imposed.

<Content Data Supply Control Through General Network>

Figure 7:
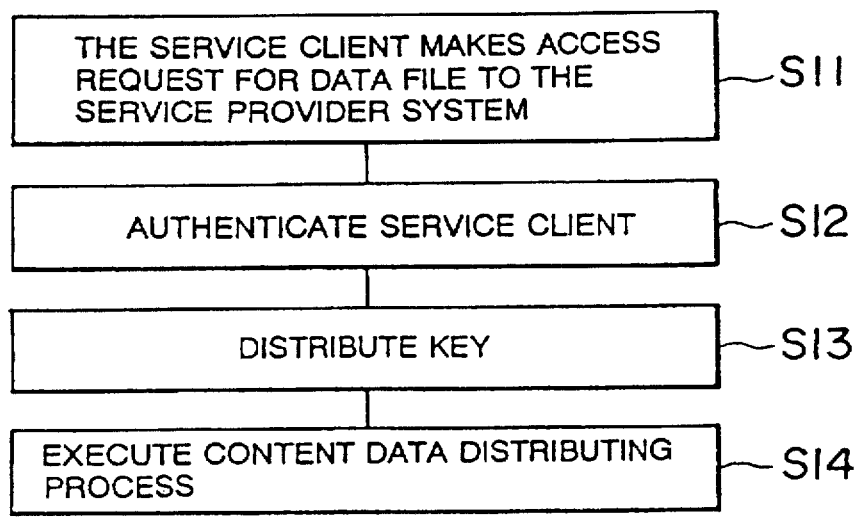
FIG. 7 is a flowchart showing the content data supplying control using a general network.

FIG. 7 shows a control when the interfaces of S1, S2 are constructed in the forms of a general network using radio channels and a variety of alternate channels. In this form, it may happen that the data are to be stolen and falsified, and hence the way how the data are encrypted is of importance in addition to the above service client authenticating process.

Explaining an outline of the operating procedures in this case, the user at first inserts the MASC 5 into the service client 6. Then, the service provider system 1 authenticates which MASC 5 it is. Next, the service provider system 1 distributes a key ($KG_j$) necessary for the service to the service client 6. Thus, the service client 6 obtains the key ($KG_j$) required. Thereafter, the service provider system 1 distributes the required content to the service client 6 and operates the accounting system. As a result, the service client 6 obtains the content by using the key ($KG_j$).

Access Request

In first step S11 in FIG. 7, the service client 6, shown in FIG. 8, makes an access request to the service provider system 1. The process of this access request is the same as step S01 in FIG. 5, and, therefore, an explanation thereof is omitted.

Authenticating Process

In next step S12 in FIG. 7, the service provider system 1, as shown in FIG. 8, authenticates the service client 6. This authenticating process is the same as step S02 in FIG. 5, and, hence, its explanation is omitted.

Key Distributing Process

In next step S13 in FIG. 7, the service provider system 1, as shown in FIG. 8, distributes a key ($KG_j$) for decrypting the encrypted content which is referred to as a title key. The title key is distributed via the S2 interface to smoothly decrypt the data of a variety of content on the side of the service client 6.

That is, the service provider system 1 generates a client individual key $K_i$ from the MASC identification ID ($ID_i$) transmitted by the MASC 5 attached to the service client 6 (the key used for authenticating the client may also be diverted as the client individual key $K_i$). The service provider system 1 encrypts a service provider ID (IDP) and a title key $KG_{1j}$ with the client individual key $K_i$. The service provider system 1 then adds a service-client-oriented destination which is a combination of the identification ID ($ID_i$, address) of the service client 6 with the identification ID (address) of the service provider system 1 to the above encrypted ID (IDP) and key $KG_{ij}$, an then transmits it to the MASC 5. An item of encrypted key data from the service provider system 1 is decrypted in the MASC 5, thereby the title key $KG_{1j}$ is obtained. Thereafter, the encrypted contents transmitted via the S1 interface are to be decrypted with this title key $KG_j$.

This key distributing process will be described with reference to a functional block diagram of FIG. 9 and a subroutine flowchart of FIG. 10. Incidentally, for an explanatory convenience, it is assumed that the encrypted contents are stored in the first data file 12 at the present time, and this is called an "old data file".

Figure 10:
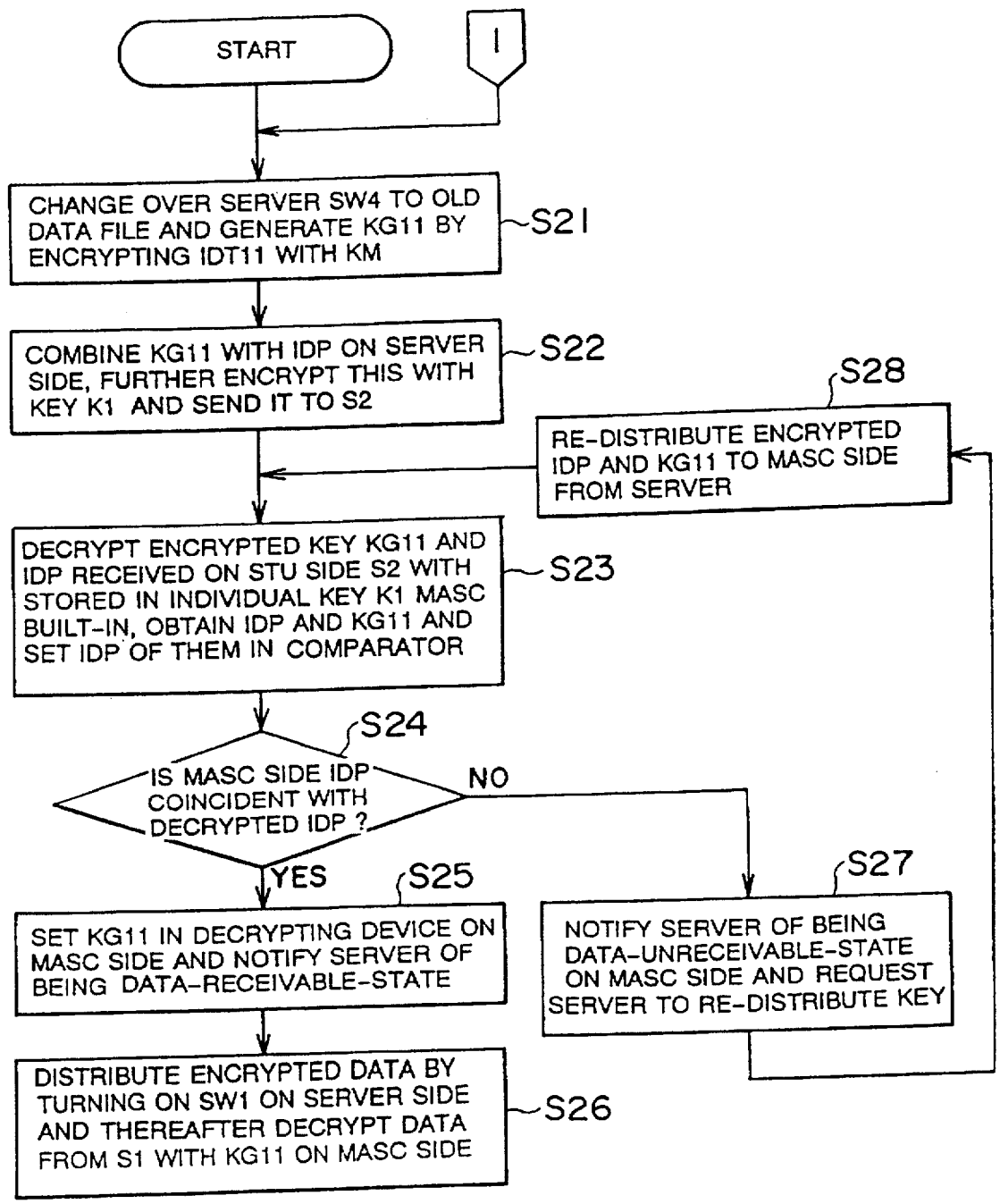
FIG. 10 is a flowchart showing the key distributing process.

Referring to FIG. 10, in first step S21, a switch SW4 provided in the key management unit 18 of the service provider system 1 is changed over to the old data file 12. Then, the title ID (IDT) corresponding to the title requested from the service client 6 is read from the old data file 12 via the switch SW4. A second key generating portion (EK) 184 encrypts a read title ID ($IDT_j$) on the basis of a second master key (KM2) 185, thereby generating a title key (third key) $KG_{1j}$.

In next step S22, a second encrypting portion (EK, third encrypting element) 183 within the key management unit 18 combines the service provider ID (IDP) received from the service provider ID memory unit 19 with the title key $KG_{1j}$ received from the second key generating portion 184. Then, the second encrypting portion 183 encrypts the service provider ID (IDP) and the title key $KG_{1j}$ on the basis of the client individual key $K_i$ generated by the first key generating portion 182 when effecting the authenticating process and then transfers the encrypted ID and key to the server 10. The server 10 distributes encrypted data ($EK_i$(IDP, $KG_{1j}$)) of the received service provider ID and title key $KG_{1j}$ to the service client 6 via the S2 interface.

In next step S23, the service client 6 distributes the encrypted data ($EK_i$(IDP, $KG_{1j}$)) of the service provider ID and of the title key $KG_{1j}$ to the MASC 5. A first decrypting portion (EK, second decrypting portion ) 101 (DES 53) in the MASC 5 decrypts this item of encrypted data by use of the individual key $K_i$ built in the ROM 57 of the MASC 5, thereby acquiring the service provider ID (IDP) and the title key $KG_{1j}$. Then, this service provider ID (IDP) is set in the comparator 102.

In next step S24, the comparator 102 in the MASC 5 compares the service provider ID (IDP) set in the first decrypting portion (EK) 101 with the service provider ID (IDP) 103 inputted through an unillustrated key when making the access request. Then, if coincident with each other, the processing proceeds to step S25. Whereas if not coincident, the processing proceeds to step S27.

In step S27, the service client 6 is informed of the effect of being unreceivable, and this effect is transferred via the S2 interface to the server 10 of the service provider system 1.

In next step S28, the server 10 of the service provider system 1 re-distributes the encrypted data (EK$_i$(IDP, KG$_{1,j}$)) of the service provider ID (IDP) and of the title key KG$_{1,j}$ that are received from the second encrypting portion (EK) 183 to the MASC 5 via the S2 interface. Thereafter, the processing is returned to the step S23.

On the contrary, in step S25, the switch SW3 within the MASC 5 is closed and the title key KG$_{1,j}$ restored in the first decrypting portion (EK) 101 is set in the second decrypting portion (EK, first decrypting element) 104 (DES 53). At the same time, the service client 6 is informed of the effect of being receivable, and this effect is then transferred via the S2 interface to the server 10 of the service provider system 1.

In next step S26, the server 10 of the service provider system 1 closes the switch SW1 and reads the encrypted content of the title corresponding to the title key KG$_{1,j}$ from the data file 12.

Content Data Distributing Process

A content data distributing process that is to be executed in step S14 in FIG. 7 is carried out immediately after step S26 in FIG. 10.

Figure 11:
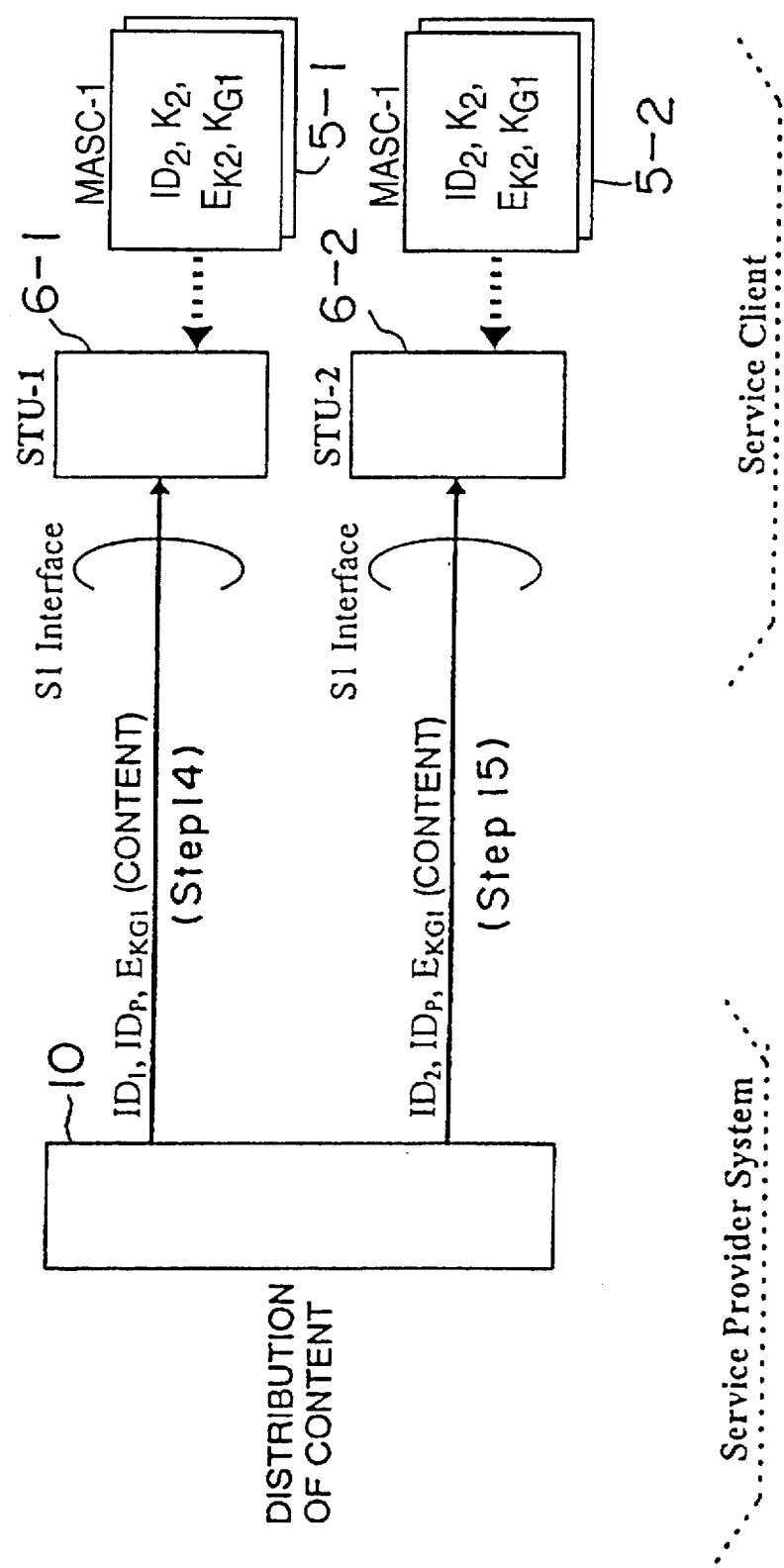
FIG. 11 is a time arrow diagram showing a content distributing process.

That is, as shown in FIG. 11, the server 10 distributes the encrypted content read from the data file 12 to the service client 6 via the S1 interface. The service client 6 transfers this encrypted content to the MASC 5. The second decrypting portion (EK) 104 (DES 53) of the MASC 5 decrypts the encrypted content by use of the set title key KG$_{1,j}$.

This decryption is specifically explained with reference to FIG. 4. The service client 6 receiving the content transmits this content temporarily to the disc drive 4 and writes it onto the optical disc 30 or allows the content to flow directly to the CPU 41. The host CPU 41 analyzes that this content has been encrypted and changes over the switch 42 to the MASC 5. The host CPU 41 then indicates the control CPU 51 of the MASC 5 to perform the decrypting process. In response to this indication, the control CPU 51 reads the encrypted content through the DL 40 and the I/O device 52, and the DES 53 (first decrypting portion 101, second decrypting portion 104) conducts the decryption. Set in this DES 53 is the title key KG$_{1}$j received via the interface 50 and the I/O device 56, and therefore the content is decrypted by use of this title key KG$_{1,j}$. The decrypted content is transmitted to the switch 42 via the I/O device 54.

The content is transferred from the switch 42 to the demultiplexer 43 and demultiplexed into the video frame and the audio frame by this demultiplexer 43. The thus demultiplexed video frame and audio frame are expanded respectively by the MPEG expansion circuits 44, 45 and converted into analog signals by the D/A converters 47, 48. Then, the video signals are transmitted to the unillustrated TV monitor, while the audio signals are transmitted to the unillustrated loud speaker.

Further, the host CPU 41 notifies the control CPU 51 within the MASC 5 every time each of the frames constituting the content is read. This control CPU 51 counts the number of notices and subtracts the accounting counter value X in the accounting data memory unit 55. Subsequently, when this accounting counter value X comes to 0, the control CPU 51 ceases the decryption by the DES 53 and causes the host CPU 41 to open the switch 42. Accordingly, there is hindered the use of such a content exceeding the use permission quantity corresponding to then amount of money to be imposed.

As described above, according to the key distributing process in this embodiment, the special key (title key KG$_{1,j}$) for the restoration is generated for every content stored in the data file 12. Accordingly, the same user is prevented from reproducing the contents of other titles by use of the same key. Also, this title key KG$_{1,j}$ is encrypted with the key (individual key K$_i$) prepared for every MASC 5, and, therefore, even if the third party intercepts the encrypted title key, it is impossible to restore the title key KG$_{1,j}$. Hence, the misappropriation by the third party can be hindered.

(Local Accounting Process)

Next, a local accounting process for applying an addition of the accounting counter value X needed for reproducing the content data will be explained with reference to FIG. 12. The service client 6 makes a request for an addition of value to the accounting counter value X with respect to the service provider system 1 on the condition that a price is paid from a bank account, and the service provider system 1 writes it to the MASC 5. Thus, in accordance with this embodiment, the accounting counter value X is managed under the MASC 5, and hence an emphasis is put especially on the prevention of the data falsification. Therefore, the digital signature put on the added value data is of importance for the service provider system 1 proving a validity of this added value. Accordingly, it is assumed that a password number is previously registered in the service provider system 1 for every MASC 5.

Access Request

Figure 12:
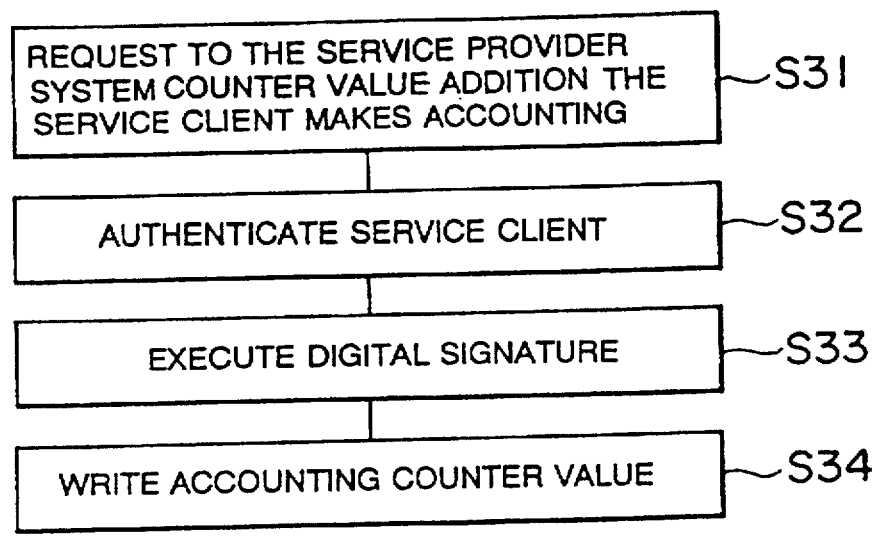
FIG. 12 is a flowchart showing a local accounting process.
Figure 13:
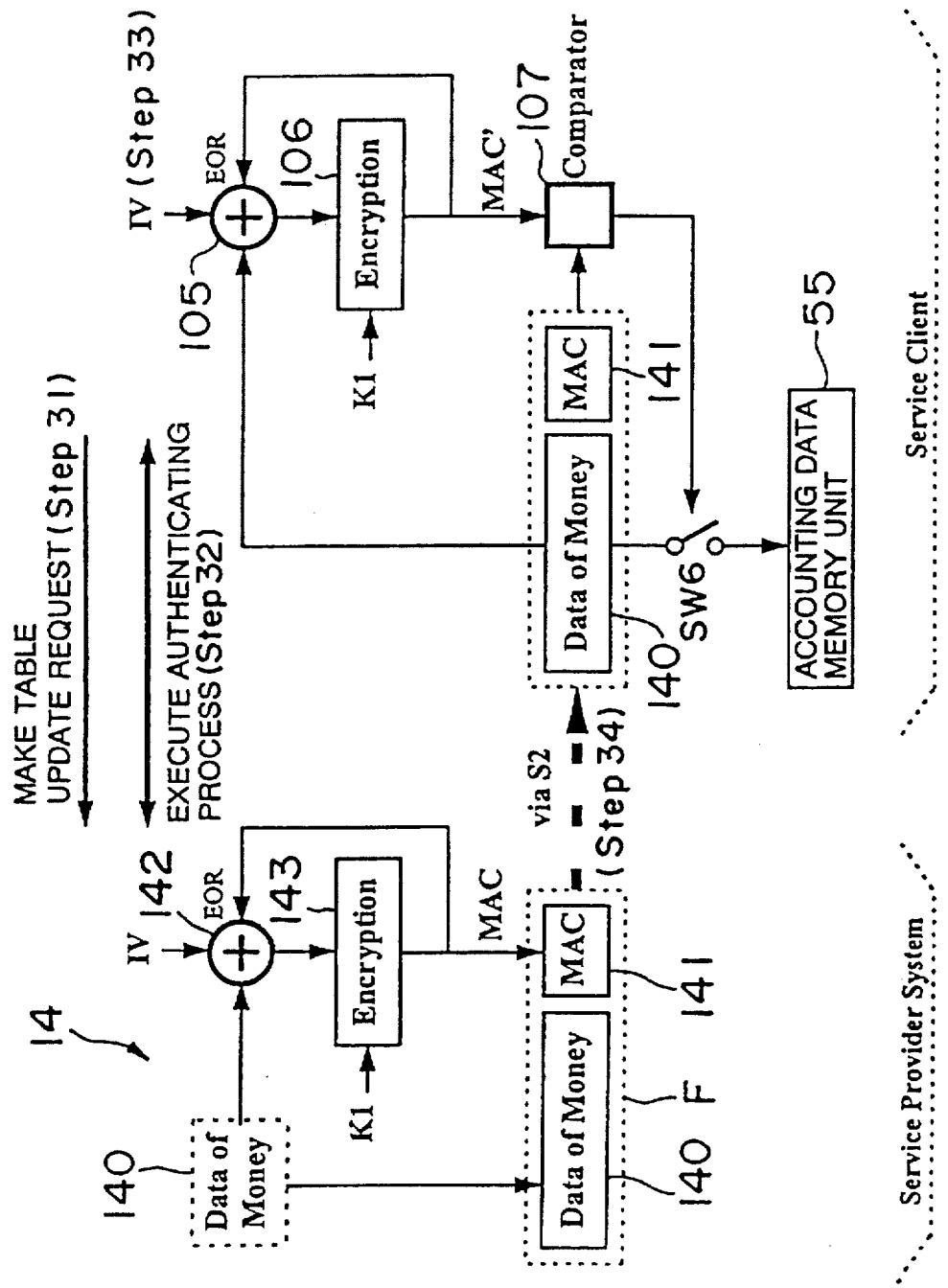
FIG. 13 is a block diagram illustrating a construction relative to a digital signature process.

In first step S31 in FIG. 12, the service client 6, as illustrated in FIG. 13, makes the access request to the service provider system 1. At this time, the service client 6 transmits, to the service provider system 1 via the S2 interface, an accounting counter value increase request command with respect to the service provider system 1 and an intrinsic-to-MASC identification ID while adding a destination of the service provider system, which is a combination of the identification ID (service provider ID: IDP) of the service provider system with the identification ID (address) of the service client 6) to the command and the intrinsic-to-MASC identification ID.

Authenticating Process

In next step S32 in FIG. 12, the service provider system 1, as illustrated in FIG. 13, authenticates the service client 6. This authenticating process is the same as step S02 in FIG. 5, and therefore its explanation is omitted.

Digital Signature Process and Writing Process of Accounting Counter value

In next step S33 in FIG. 12, the digital signature is implemented in the service client 6, and, in next step S34, the service provider system 1 effects a supplementing process of the accounting counter value X (see FIG. 13).

That is, a message authentication by the user is useful for preventing the act of falsifying the data on the communication path by the third party as well as in the service client 6 by the user when transferring and receiving an item of sensitive data relative to accounting between the service provider system 1 and the service client 6 and for attaining a smooth transaction between the concerned parties. Herein, a MAC (MESSAGE AUTHENTICATION CODE) method based on ISO 8731-1 is employed.

The digital signature unit 14 of the service provider system 1 stores a transmission frame F with a data block (DATA OF MONEY) 140 of the supplemented counter value corresponding to an amount of money paid from the user's bank account. The data block (DATA OF MONEY) 140 of the supplemented counter value is subjected to the signature process (step S33) by use of a serial number (IV) incremented corresponding to the number of addition hysteresis with respect to the MASC 5 of the user. That is, the data block (DATA OF MONEY) 140 of the supplemented counter value is encrypted by use of the password number (IV) in an exclusive OR circuit 142 and a third encrypting portion (Encryption) 143. A final processing result (MAC) of the signature process described above is stored in the transmission frame F as an item of data for the service provider system 1 proving the validity of the supplemented counter value. This transmission frame F is transmitted to the MASC 5 attached to the service client 6 via the S2 interface (step S34).

The MASC 5 performs the same process as that on the part of the service provider system 1 with respect to the transmission frame F received. That is, the data block (DATA OF MONEY) 140 of the supplemented counter value is read from the transmission frame F. Executed then are the signature processes for all the data blocks (DATA OF MONEY) 140 of the supplemented counter value by use of the serial number (IV) incremented corresponding to the number of addition hysteresis in the exclusive OR circuit 106 and the encrypting circuit (Encryption) 106 (DES 53). Note that this serial number (IV) normally synchronizes with the serial number (IV) stored in the digital signature unit 14 of the service provider system 1. Next, the comparator 107 compares a MAC's value (MAC') generated as a result of the signature process with a MAC 141 value stored in the transmission frame F. If the two values are the same, the comparator 107 determines that the data block (DATA OF MONEY) 140 of the supplemented counter value stored in the transmission frame F is a correct data corresponding to the amount of money, and a switch SW6 is closed. Hereupon, this supplemented counter value is added to the accounting counter value X stored in the accounting data memory unit 55.

As a consequence of the above, if the user reads the supplemented counter value from the transmission frame F and rewrites it, this rewritten supplemented counter value can not be added to the accounting counter value X, and therefore the illegal act can be prevented.

Parameters used for this digital signature process go as follows:

| Encrypting Process | : DES |
|---|---|
| Signature Key | : 56 bits |
| MAC | : 32 bits (which are left 32 bits extracted from a 64-bit output) |
| Amount-of-Money Data | : 64-bit Block Unit (padding bits as a 32-bit shortage are inserted) |

(Key Updating Process)

Figure 14:
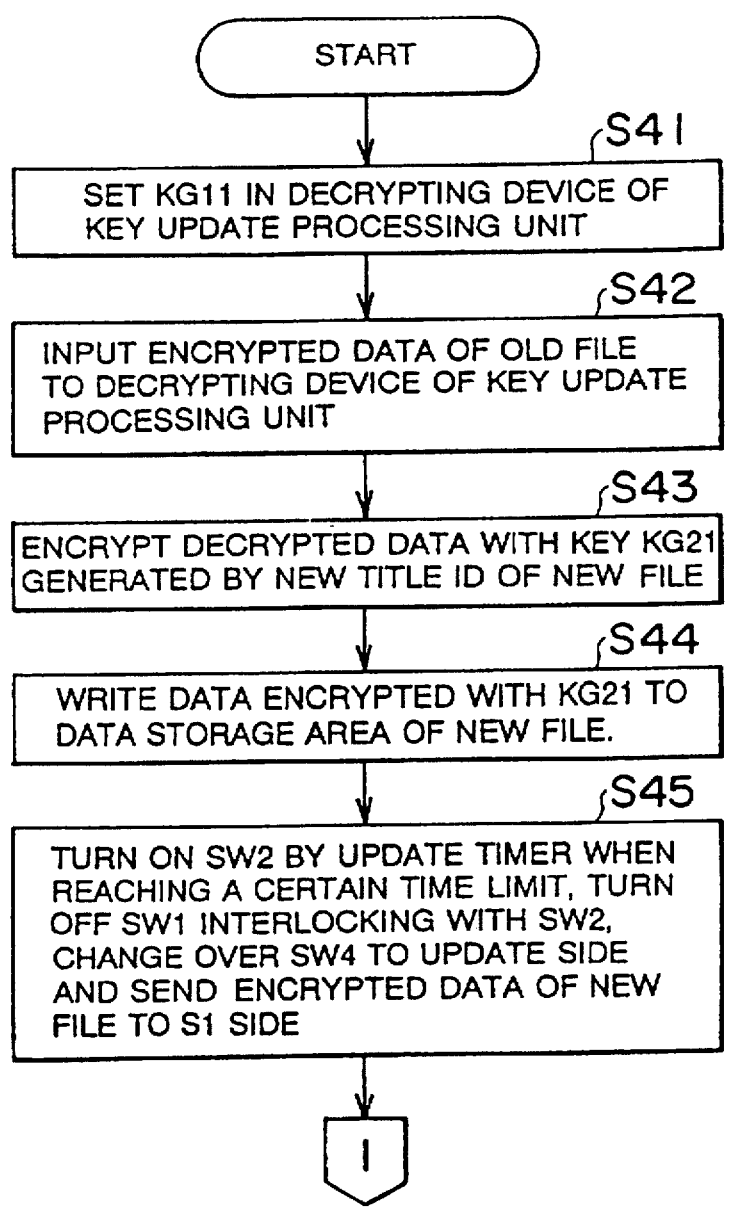
FIG. 14 is a time arrow diagram showing a key updating process.

Given next is an explanation of a process of re-encrypting the contents stored in the old data file 12 with a title key $KG_{2j}$ at intervals of a fixed time and storing the new data file 13 with the thus re-encrypted contents with reference to a block diagram of FIG. 9 and a flowchart of FIG. 14.

To be specific, the contents of a variety of titles that are managed by the service provider system 1 are encrypted beforehand with the respective keys $KG_{1j}$. If permanently encrypted with the same key, however, a risk against the unlawful decryption thereof by a third party arises. For this reason, it is required that the encryption be re-performed by periodically updating the title keys $KG_1$. Further, the content of a newly added title is also required to be encrypted with a title key $KG_{2j}$ corresponding to the title. Therefore, in accordance with this embodiment, the data files are classified into the first data file 12 and the second data file 13. The encrypted data that are now running are stored in one data file (old data file), while the encryption contents newly encrypted by executing the key updating process of FIG. 14 are stored in the other data file (new data file). As a premise of this process of FIG. 14, it is assumed that the second master key (KM2) 185 of the key management unit 18 is absolutely identical with the second master key (KM2) 163 of the key update processing unit 16. Further, the title key $KG_{1j}$ used once is to be disposed of without reusing it, and, hence, the second master keys 163, 185 used for generating the title key $KG_{1j}$ are changed each time the key is updated.

The process of FIG. 14 starts with every period set in the key update timer 17. That is, in this embodiment, the title key $KG_{1j}$ is updated at intervals of, e.g., one week, taking a program cycle and a security factor into consideration. Note that a start timing of the process of FIG. 14, i.e., a timing of storing the new data file with a new content re-encrypted with the new title key $KG_{2j}$ is, as a matter of course, on the running of the old data file. Also, if the first data file 12 is set as the old data file, the switch SW1 is closed, whereas the switch SW2 is opened. Then, the switch SW4 is changed over to the first data file 12, while the switch SW5 is changed over to the second data file 13. Whereas if the second data file 13 is set as the old data file, the setting is absolutely reverse.

In the first step S41 in the process of FIG. 14, the title key $KG_1$ generated based on a present title ID ($IDT_{1j}$) in the second key generating portion (EK) 184 is set in a decrypting device (DK, third decrypting element) 161 of the key update processing unit 16.

In the next step S42, the encryption content corresponding to the relevant title key $KG_1$ stored in the old data file 12 is set in the decrypting device (DK) 161 of the key update processing unit 16 and then decrypted based on the title key $KG_1$.

In the next step S43, a third key generating portion (EK, key updating element) 164 of the key update processing unit 16 encrypts one of title IDs ($IDT_{2j}$) stored beforehand in the new data file 13 by use of the second master key (KM2) 163, thereby generating a new title key $KG_{2j}$. A fourth encrypting portion (EK, third encrypting element) 162 re-encrypts the decrypted content on the basis of the new title key $KG_{2j}$.

In the next step S44, the encryption content re-encrypted by the fourth encrypting portion (EK) 162 is written to the new data file 13 (corresponding to a writing element).

In the next step S45, the key update timer 17 waits a certain time limit (e.g., after midnight on every Sunday) and then changes over the respective SW1, SW2, SW4, SW5. For example, if the first data file 12 is set as the old data file, the switch SW2 is closed, whereas the switch SW1 is opened. Then, the switch SW4 is changed over to the second data file 13, while the switch SW5 is changed over to the first data file 12. The title IDs ($IDT_{2j}$) stored in the new data file 13 can be thereby transmitted to the key management unit 18, and the encryption contents stored in the new data file 13 can be also thereby transmitted to the server 10. There can be further executed the updating process of the next time, wherein the second data file 13 is treated as the old data file. When completing the process in this step S45, the processing is transferred to step S21 of FIG. 10.

(Emergency counterplan of MASC)

If the user encounters a loss or steal of the MASC 5 is stolen, the service provider urgently destroys the key $K_i$ and reissues a MASC 5. More specifically, the user, upon confirming the fact that the MASC 5 is lost or stolen, immediately informs the service provider of this effect through a communication device such as a telephone. At this time, the user informs the service provider of a user's name, address and telephone number. Next, the service provider confirms the user with the data in the profile 11 of the service provider system 1 and thereafter calls the user back through the telephone. Then, if the service provider and the user confirm each other and agree with each other, the service provider deletes all the user data from the profile 11, and the corresponding MASC 5 ID ($ID_j$) is made missing permanently. Thereafter, the user goes and makes an application for re-registration to the service provider or a nearby special agent or ordinary agent and has them issue the MASC 5 with a new ID ($ID_i$).

According to a first aspect of the thus constructed client authenticating system of the present invention, the identification data used for the authentication between the user (client) and the service provider are dynamically created both in the client system and the service provider system, and it is therefore impossible for the third party to steal the identification data.

Further, according to a second aspect of the client authenticating system of the present invention, the data and functions for the authentication can be given to the module readily portable by the user and mounted in common to the plurality of reproducing apparatuses. Consequently, the reproducing apparatus is capable of reproducing the contents irrespective of whether or not the reproducing apparatus is owned by the user himself or herself, and the service provider is capable of surely collecting the charges for reproducing the contents.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A system for authenticating a client in a data distributing system having a data supplying apparatus for holding data and a client receiving the data distributed via a communication interface from said data supplying apparatus, said data supplying apparatus comprising:
   a key outputting unit for outputting a first key generated by processing identification data intrinsic to each said client;
   random-number generating means for generating a random number in response to an access request from said client;
   first encrypting means for encrypting the random number and the identification data with said first key and thereby outputting a first authenticator;
   first transmitting means for transmitting the random number to said client;
   first receiving means for receiving a second authenticator from said client; and
   comparing means for comparing the first and second authenticators with each other and, if the two authenticators are coincident with each other, authenticating the access request from said client;
said client comprising:
   identification data holding means for holding an identification data intrinsic to said client;
   access requesting means for making an access request to said data supplying apparatus with said identification data;
   second receiving means for receiving the random number transmitted from said data supplying apparatus;
   key holding means for holding a second key identical with said first key;
   second encrypting means for encrypting the random number and said identification data with the second key and thereby outputting the second authenticator; and
   second transmitting means for transmitting the second authenticator to said data supplying apparatus.

2. A system for authenticating a client according to claim 1, wherein said data supplying apparatus distributes, only when said comparing means determines that the two authenticators are coincident with each other, the data to said client.

3. A system for authenticating a client according to claim 1, wherein said data supplying apparatus distributes the encrypted data to said client, and said client further comprises first decrypting means for decrypting the encrypted data.

4. A system for authenticating a client according to claim 3, wherein said data supplying apparatus further comprises third encrypting means for encrypting a third key by use of the first key for decrypting the data,
   said client further comprising second decrypting means for decrypting the encrypted third key by use of the second key, and
   said first decrypting means decrypts the encrypted data with the third key decrypted by said second decrypting means.

5. A system for authenticating a client according to claim 4, wherein said data supplying apparatus further includes;
   a plurality of storage devices for storing the encrypted data;
   third decrypting means for decrypting the encrypted data stored in said one storage device by use of the third key;
   key updating means for updating the third key;
   third encrypting means for encrypting the data decrypted by said third decrypting means by use of the third key updated by said key updating means; and
   storing means for storing said other storage device with the data encrypted by said third encrypting means.

6. A system for authenticating a client according to claim 5, wherein said third decrypting means, said key updating means, said third encrypting means and said storing means are started at intervals of a fixed time.

7. A system for authenticating a client according to claim 1, wherein said client is constructed of a body unit for receiving the data and a module unit detachably attached to said body unit, and
   said module unit includes at least said key holding means and said second encrypting means.

8. A method of authenticating a client in a data distributing system constructed of a data supplying apparatus for holding data and a client receiving the data transmitted via a communication interface from said data supplying apparatus, said method comprising the steps of:
   causing said client to make an access request to said data supplying apparatus with an identification data for identifying said client itself informed to the apparatus;

causing said data supplying apparatus to generate a random number in response to the access request, transmit the random number to said client, encrypt the random number and said identification data by use of a first key generated by processing said identification data and convert the encrypted number into a first authenticator;

causing said client to encrypt the random number by use of a second key previously held as the one having the same content as that of the first key, convert the encrypted random number and said identification data into a second authenticator to said data supplying apparatus, and causing said data supplying apparatus to compare the first authenticator with the second authenticator and, if the two authenticators are coincident with each other, authenticate that an access request is given from said client.

* * * * *

UNITED STATES PATENT AND TRADEMARK OFFICE
CERTIFICATE OF CORRECTION

PATENT NO. : 5,784,464

DATED : July 21, 1998

INVENTOR(S) : Akiyama et al.

It is certified that error appears in the above-identified patent and that said Letters Patent is hereby corrected as shown below:

Col. 1,     line 30, delete ",";
              line 60, change "a content" to --contents--;

Col. 2,     line 23, delete "," (second occurrence).

Col. 3,     line 23, "after "key.", NO NEW PARAGRAPH. ["In this...." (line 24) does not start a new paragraph].

Col. 13,    line 46, change "forms" to --form--.

Col. 19,    line 2, delete "or steal of".

Col. 20,    line 22, after "said client, and" begin a NEW PARAGRAPH with "said" (second occurrence).

Signed and Sealed this

Ninth Day of February, 1999

Attest:

Attesting Officer

Acting Commissioner of Patents and Trademarks